United States Patent
Kosno et al.

(10) Patent No.: US 11,153,404 B2
(45) Date of Patent: Oct. 19, 2021

(54) CLIENT-SERVER WORKLOAD SHARING

(71) Applicant: International Business Machines Corporation, Armonk, NY (US)

(72) Inventors: Zbigniew Janusz Kosno, Gorlice (PL); Tomasz Ploskon, Cracow (PL); Umit Bektas, Cracow (PL); Karol Cisowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 16/740,526

(22) Filed: Jan. 13, 2020

(65) Prior Publication Data
US 2021/0218823 A1    Jul. 15, 2021

(51) Int. Cl.
*H04L 29/08* (2006.01)
*G06F 16/25* (2019.01)
*H04L 29/06* (2006.01)

(52) U.S. Cl.
CPC ........ *H04L 67/2828* (2013.01); *G06F 16/254* (2019.01); *H04L 67/2861* (2013.01); *H04L 67/42* (2013.01)

(58) Field of Classification Search
CPC . H04L 67/2828; H04L 67/2861; H04L 67/42; G06F 16/254
USPC ........................................................ 709/203
See application file for complete search history.

(56) References Cited

U.S. PATENT DOCUMENTS

| | | | |
|---|---|---|---|
| 8,176,497 B2 | 5/2012 | Yang | |
| 10,169,413 B2 | 1/2019 | Asaad | |
| 2009/0183152 A1* | 7/2009 | Yang | G06F 9/5072 718/1 |
| 2013/0054808 A1* | 2/2013 | Hildebrand | G06F 9/505 709/226 |
| 2014/0317172 A1* | 10/2014 | Granshaw | H04L 67/1008 709/203 |
| 2015/0365478 A1* | 12/2015 | Bernal | H04L 67/10 709/203 |
| 2016/0080259 A1* | 3/2016 | Biancaniello | H04L 45/74 709/203 |
| 2017/0316007 A1 | 11/2017 | Vandenberg | |
| 2019/0332451 A1* | 10/2019 | Tamjidi | G06F 9/547 |
| 2020/0356618 A1* | 11/2020 | Shribman | G06F 16/955 |

(Continued)

*Primary Examiner* — Frantz B Jean
(74) *Attorney, Agent, or Firm* — Brian M. Restauro

(57) ABSTRACT

An average computing resource usage for each computing resource associated with a client device is determined. A determination is made whether a workload associated with a database query request received by a database management system should be shared with the client device. In response to determining that the workload associated with the database query request should be shared, one or more plug-ins are transmitted from the database management system to the client device. The one or more plug-ins are software components that add specific features to at least one computer program on the client device. At least one portion of the workload associated with the database query request is transmitted to the client device. The client device processes the workload using the plug-ins, the computer program on the client device, any other programs required to process the workload, and the one or more computing resources associated with the client device.

20 Claims, 3 Drawing Sheets

(56) References Cited

U.S. PATENT DOCUMENTS

2020/0359339 A1\* 11/2020 Syed .................... H04W 52/365
2021/0034434 A1\* 2/2021 Gellai, Sr. ............. G06F 9/5083

\* cited by examiner

CLIENT-SERVER WORKLOAD SHARING

BACKGROUND

The present invention relates generally to the field of database management systems (DBMS), and more particularly to sharing of workloads between a DBMS and a client device.

A database management system, or DBMS, is a software system that uses a standard method of cataloging, retrieving, and running queries on data. The DBMS manages incoming data, organizes it, and provides ways for the data to be modified or extracted by users or other programs. The DBMS generally manipulates the data itself, the data format, field names, record structure, and file structure. The DBMS also defines rules to validate and manipulate data.

SUMMARY OF THE INVENTION

Embodiments of the present invention include an approach for sharing of workloads between a DBMS and a client device. In one embodiment, an average computing resource usage, based on a plurality of real-time attributes received from a client device over a period of time, for each computing resource associated with the client device is determined. A determination is made whether a workload associated with a database query request received by a database management system should be shared between the database management system and the client device. In response to determining that the workload associated with the database query request should be shared between the database management system and the client device, one or more plug-ins are transmitted from the database management system to the client device. The one or more plug-ins are software components that add specific features to at least one computer program on the client device. At least one portion of the workload associated with the database query request is transmitted to the client device. The client device processes the at least one portion of the workload using the transmitted one or more plug-ins, the at least one computer program on the client device, any other programs required to process the workload, and the one or more computing resources associated with the client device.

DETAILED DESCRIPTION

Embodiments of the present invention recognize that a database management system (DBMS) is a valuable tool for running queries on a variety of data. Resource consumption of a DMBS can approach one-hundred percent during peak usage hours as the central processing unit is saturated running complex analytical queries on large data sets. This resource consumption results in an unacceptable slow down of query processing for one or more clients accessing the DBMS.

Embodiments of the present invention recognize that there may be a method, computer program product, and computer system for sharing of workloads between a DBMS and a client device. In an embodiment, the method, computer program product, and computer system monitor resources available in a client device that requests a DBMS query. In the embodiment, when the DBMS is resource-constrained and the client has available resources, the query workload can be shared.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
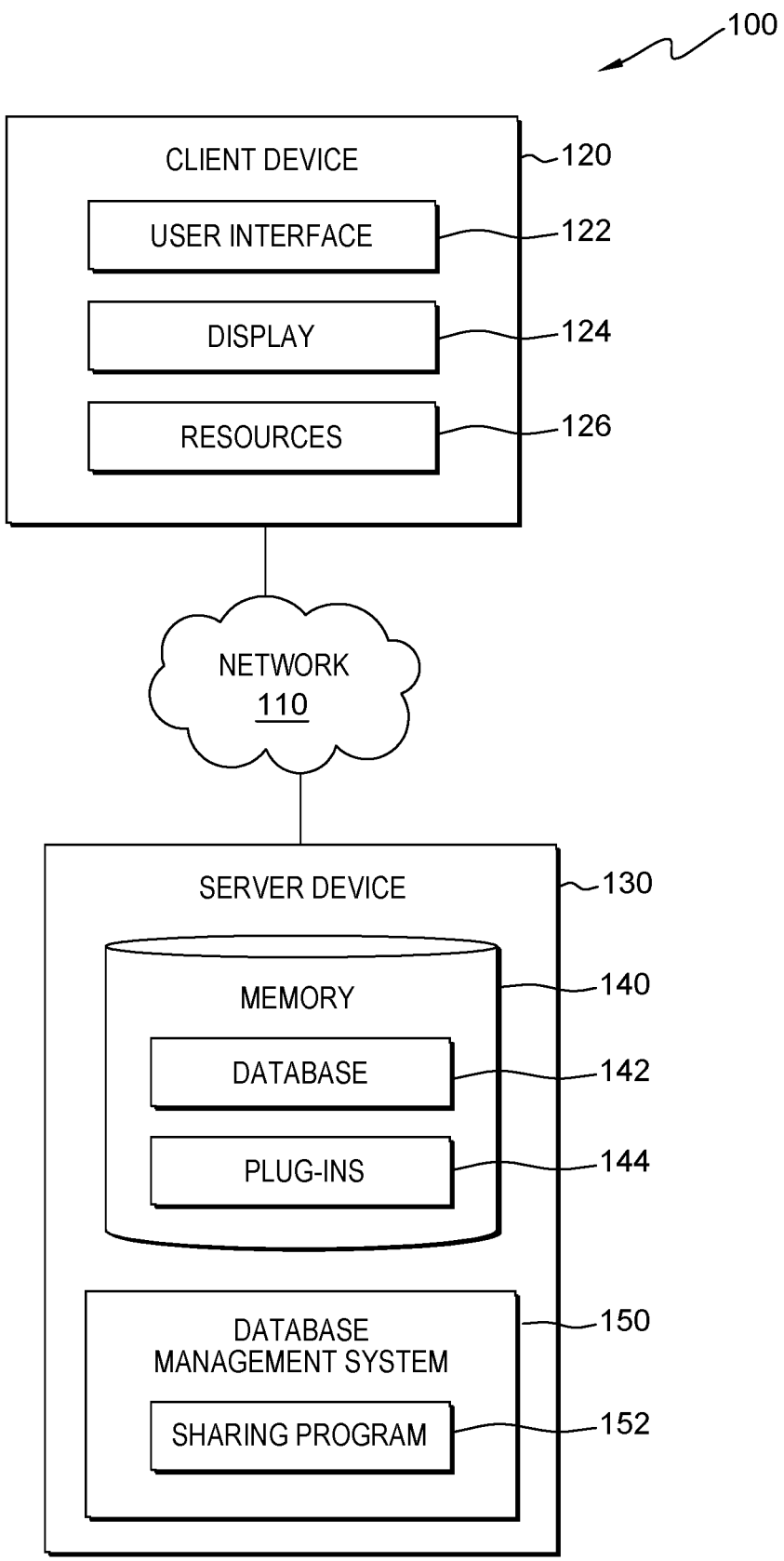
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120 and server device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with client device 120 and server device 130 over network 110.

In embodiments of the present invention, client device 120 and server device 130 are connected to network 110, which enables client device 120 and server device 130 to access other computing devices and/or data not directly stored on client device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120 and server device 130, and any other computing devices (not shown in FIG. 1) connected to network 110, in accordance with embodiments of the present invention. In an embodiment, data received by another computing device (not shown in FIG. 1) in computing environment 100 is communicated to client device 120 and server device 130 via network 110.

According to embodiments of the present invention, client device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120 can be a standalone computing device, a management server, a web server, a mobile computing device, or any other electronic device or computing system capable of receiving, transmitting, and processing data. In other embodiments, client device 120 can represent computing systems utilizing multiple computers as a server system, such as in a cloud computing environment. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. In an embodiment, computing environment 100 includes any number of client device 120. Client device 120 may include internal and external hardware components as depicted and described in further detail with respect to FIG. 3, in accordance with embodiments of the present invention. Client device 120 includes user interface 122, display 124, and resources 126.

In an embodiment, user interface 122 provides an interface between client device 120, server device 130, and sharing program 152. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between client device 120, server device 130, and sharing program 152. Mobile application software, or an "app," is a computer program designed to run on smartphones, tablet computers and other mobile devices. User interface 122 enables a user of client device 120 to interact with server device 130, sharing program 152, and any other computing devices not shown in FIG. 1.

According to an embodiment, display 124 is an electronic visual device for a desktop computer, laptop computer, tablet computer, smartphone, smart-watch, and the like. Display 124 may include a touchscreen which is an input device layered on top of the display for allowing a user to control an electronic device via simple or multi-touch gestures by touching display 124 with a special stylus and/or one or more fingers. Display 124 displays user interface 122 as well as open programs and applications, allowing a user of client device 120 to interact with any open programs and applications via a keyboard and mouse (not shown in FIG. 1) or via any other input technologies known in the art. Display 124 may be a thin film transistor liquid crystal display (TFT-LCD), a flat panel LED (light emitting diode) display, or a cathode ray tube (CRT). Display 124 may be connected to client device 120 via VGA (video graphics array), DVI (digital video interface), HDMI (High Definition Multi-Media Interface or any other connection type known in the art.

In an embodiment of the present invention, resources 126 is a collection of computing resources included in client device 120. According to an embodiment of the invention, resources 126 includes, but is not limited to, an operating system, a central processing unit, one or more other processors, random access memory, persistent memory, cache memory, a communications channel, and other similar computing resources known in the art. In an embodiment, when resources of server device 130 are running at or near full capacity, resources 126 may be available to process some or all of a workload query made by client device 120 to server device 130.

According to embodiments of the present invention, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 may include internal and external hardware components as depicted and described in further detail with respect to FIG. 3, in accordance with embodiments of the present invention. In an embodiment, server device 130 is substantially similar to client device 120. Server device 130 includes memory 140 and database management system (DBMS) 150.

In an embodiment, memory 140 is storage that is written to and/or read by sharing program 152, and any other programs and applications on client device 120 and server device 130. In one embodiment, memory 140 resides on server device 130. In other embodiments, memory 140 resides on client device 120, on any other device (not shown) in computing environment 100, in cloud storage, or on another computing device accessible via network 110. In yet another embodiment, memory 140 represents multiple storage devices within server device 130. Memory 140 may be implemented using any volatile or non-volatile storage media for storing information, as known in the art. For example, memory 140 may be implemented with a tape library, optical library, one or more independent hard disk drives, multiple hard disk drives in a redundant array of independent disks (RAID), solid-state drives (SSD), or random-access memory (RAM). Similarly, memory 140 may be implemented with any suitable storage architecture known in the art, such as a relational database, an object-oriented database, or one or more tables. In an embodiment of the present invention, sharing program 152, and any other programs and applications (not shown in FIG. 1) operating on client device 120 and server device 130 may store, read, modify, or write data to memory 140. In an embodiment of the present invention, data stored to memory 140 includes, but is not limited to, data stored to database 142 and plug-ins 144.

According to embodiments of the present invention, database 142 is a memory location within memory 140 where a plurality of data and database objects can be stored by client device 120, server device 130, DBMS 150, and sharing program 152. According to an embodiment, data stored to database 142 includes, but is not limited to, query data, results of queries processed on the query data, tables, materialized views, clusters, sequences, indexes, synonyms, and the like.

In an embodiment, plug-ins 144 is a memory location within memory 140 where sharing program 152 can store a plurality of plug-ins used by DBMS 150 for processing data queries. According to an embodiment, a plug-in is a software component that adds a specific feature to at least one computer program on the client device. When a computer program supports plug-ins, it enables customization. In an embodiment, any plug-in stored to plug-ins 144 can be transmitted to client device 120 via network 110 so that client device 120 can utilize the transmitted plug-in for workload sharing. In the embodiment, transmitted plug-ins can be utilized and then deleted by client device 120 or can be stored on client device 120 for future utilization.

According to an embodiment of the present invention, database management system (DBMS) 150 is a software system that uses a standard method of cataloging, retrieving, and running queries on data. In an embodiment, DBMS 150 manages incoming data, organizes it, and provides ways for the data to be modified or extracted by users or other programs. Further in the embodiment, DBMS 150 generally manipulates the data itself, the data format, field names, record structure, and file structure. Further yet in the embodiment, DBMS 150 also defines rules to validate and manipulate data. According to an embodiment, DBMS 150 includes sharing program 152.

In an embodiment of the present invention, sharing program 152 can be a program, a subprogram of a larger program, an application, a plurality of applications, or mobile application software, which functions to share workloads between a DBMS and a client device. A program is a sequence of instructions written by a programmer to perform a specific task. In an embodiment, sharing program 152 runs by itself. In other embodiments, sharing program 152 depends on system software (not shown in FIG. 1) to execute. In one embodiment, sharing program 152 functions as a stand-alone program residing on server device 130. In another embodiment, sharing program 152 works in conjunction with other programs, applications, etc., found in computing environment 100. In yet another embodiment, sharing program 152 resides on client device 120. In yet another embodiment, sharing program 152 resides on other computing devices (not shown in FIG. 1) in computing environment 100, which are interconnected to client device 120 and server device 130 via network 110.

According to an embodiment of the present invention, sharing program 152 receives attributes of a client device. In the embodiment, sharing program 152 receives the real-time resource attributes of the client device. Further in the embodiment, sharing program 152 determines average resource usage of the client device and the server device hosting sharing program 152. Further yet in the embodiment, sharing program 152 receives an indication of a database query, transmitted by the client device, being received by a DBMS. Further yet in the embodiment, sharing program 152 determines whether the workload associated with the database query should be shared with the client device based on the determined resource usages. Responsive to determining that the workload should be shared, sharing program 152 transmits one or more plug-ins and the shared workload to the client device. Further yet in the embodiment, sharing program 152 receives the shared workload results from the client device. Further yet in the embodiment, sharing program 152 completes processing of the entire workload, using the received shared workload results, and transmits the results of the database query to the client device.

Figure 2:
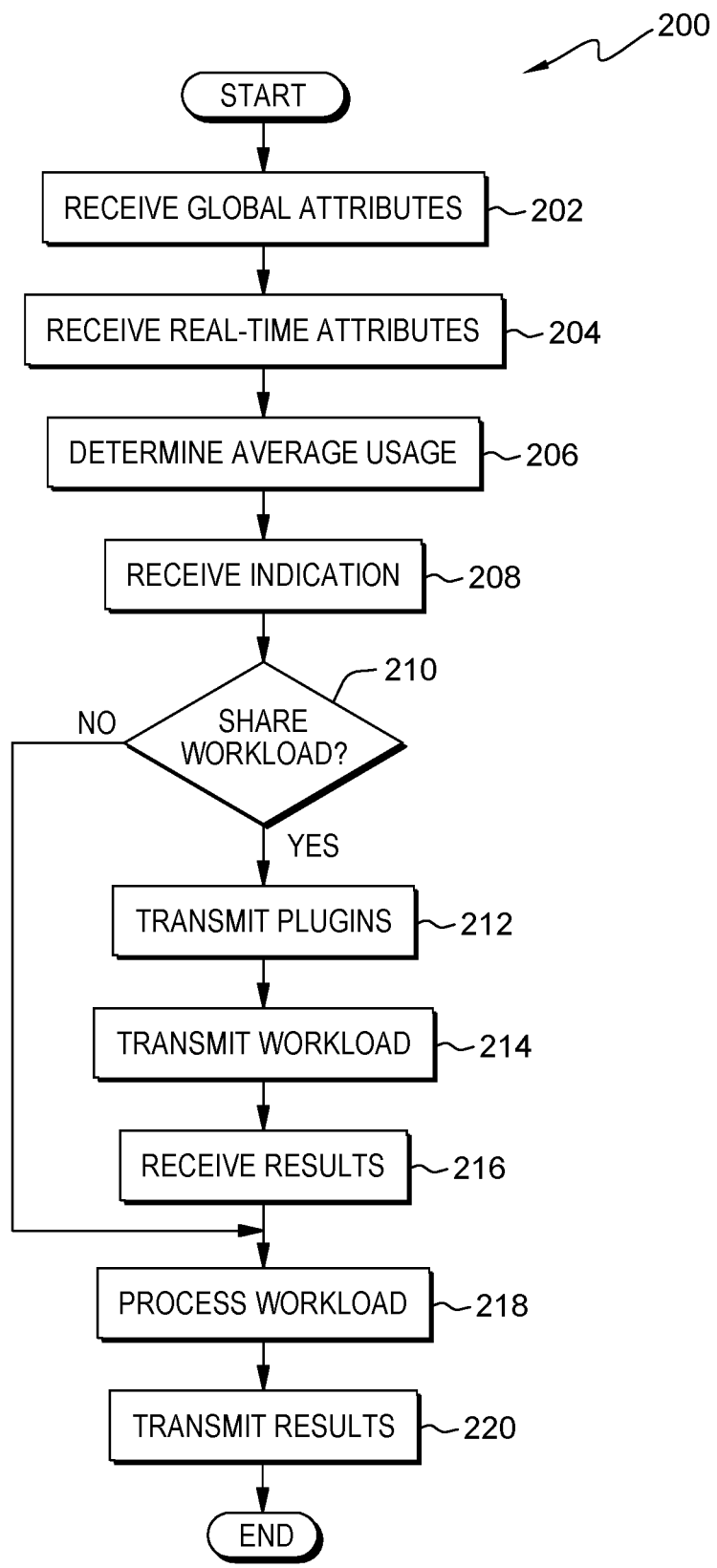
FIG. 2 depicts a flowchart of a program for sharing of workloads between a DBMS and a client device, in accordance with an embodiment of the present invention.

FIG. 2 is a flowchart of workflow 200 depicting a method for sharing of workloads between a database management system (DBMS) and a client device. In one embodiment, the method of workflow 200 is performed by sharing program 152. In an alternative embodiment, the method of workflow 200 is performed by any other program working with sharing program 152. In an embodiment, a user, via user interface 122, invokes workflow 200 upon transmitting a database query to client device 130. In an alternative embodiment, a user invokes workflow 200 upon accessing sharing program 152 on server device 130 via network 110.

In an embodiment, sharing program 152 receives global attributes (step 202). In other words, sharing program 152 receives all the attributes of client device 120. According to an embodiment, the attributes received by sharing program 152 include, but are not limited to, resources such as operating system, central processing unit (CPU), other processors, cache memory, random access memory, persistent memory, input/output bandwidth, and the like; kernel module(s) installed; kernel version(s); installed system libraries and utilities; system configuration; etc. In an embodiment, sharing program 152 receives the global attributes upon a request to client device 120 by sharing program 152. According the embodiment, (i) client device 120 can provide one-hundred percent of its computing resources when responding to the request by sharing program 152 or (ii) client device 120 can provide a less than one-hundred percent subset of its computing resources thus reserve resources for use by client device 120 when responding to the request by sharing program 152 (e.g., client device 120 can report free memory as forty percent when sixty percent of the memory is free thereby reserving twenty percent of the memory for use by client device 120). In another embodiment, sharing program 152 receives the global attributes from client device 120 on a periodic basis (e.g., every five minutes, every fifteen minutes, etc.). In yet another embodiment, sharing program 152 receives the global attributes whenever server device 130 initiates a connection with client device 120. In yet another embodiment, sharing program 152 receives the global attributes whenever server device 130 receives a database query from client device 120. According to an embodiment of the present invention, sharing program 152 receives the global attributes of client device 120 via network 110 every ten minutes. For example, every ten minutes, a program on a company database server that includes a database management server (DBMS) receives the global attributes of a desktop computer assigned to Bill.

According to an embodiment of the present invention, sharing program 152 receives real-time attributes (step 204). In other words, sharing program 152 receives the current, real-time usage attributes of the client device. In an embodiment, the current, real-time usage attributes received by sharing program 152 includes, but is not limited to, current CPU usage, current usage of any other processors, current memory available (i.e., free memory), and the like. In the embodiment, sharing program 152 receives the real-time attributes based on a request to client device 120 made by sharing program 152. Further in the embodiment, sharing program 152 receives the real-time attributes from client device 120 whenever client device 120 sends a database query to server device 130. According to an embodiment of the present invention, sharing program 152 receives the real-time attributes of client device 120 via network 110; in the embodiment, the real-time attributes were provided along with a database query to DBMS 150. For example, Bill has submitted a database query of the sales records in the previous quarter for his company using the desktop computer; the desktop computer provided the following real-time attributes, along with the database query, to the company server and the DBMS: twenty percent of the processing capability of the desktop computer is in use and ten percent of the memory capability of the desktop computer is being utilized.

In an embodiment, sharing program 152 determines average usage (step 206). In other words, responsive to receiving multiple instances of the real-time attributes of client device 120, sharing program 152 determines an average resource usage of client device 120. According to an embodiment of the present invention, sharing program 152 determines the average usage of resources of client device 120 whenever real-time attributes are received from client device 120 (independent of time), this is known as an "overall average resource usage" (i.e., a simple average as determined by a basic averaging formula as known in the art). According to another embodiment, sharing program 152 determines the average usage of resources of client device 120 in specific time blocks based on the real-time attributes received over a period of time (e.g., multiple days, weeks, months, etc.), this is known as a "time specific resource usage". For example, if the real-time attributes of client device 120 are received at 9:00 AM, sharing program 152 may determine an average resource usage based on only the real-time attributes received from 8:00 AM to 10:00 AM. Similarly, time specific data would be used to determine an average resource usage from 10:00 AM to 12:00 PM, 12:00 PM to 2:00 PM, 2:00 PM to 4:00 PM, etc. In an embodiment, sharing program 152 also determines the average resource usage of server device 130 in the same manner so that sharing decision may be made using the most relevant information. According to an embodiment of the present invention, sharing program 152 determines (i) the average resource usage of client device 120 based on the received real-time attribute data and (ii) the average resource usage of server device 130; each determination is made for two-hour time blocks. For example, between the hours of 8:00 AM and 10:00 AM, the desktop computer used by Bill has the following average resource usages: forty percent of the processing capability and thirty percent of the memory capability are in use on average. In the example, in the same time block, the company server has average resources usage of sixty percent of the processing capability and fifty percent of the memory capability.

According to an embodiment of the present invention, sharing program 152 receives an indication (step 208). In other words, sharing program 152 receives an indication that a database query request has been submitted to server device 130. In an embodiment, the database query request is submitted by a user of client device 120 via network 110. In another embodiment, the database query request is received from any other computing device within computing environment 100 (not shown in FIG. 1). According to an embodiment, sharing program 152 receives an indication that a database query request has been submitted by a user of client device 120 via network 110 and has been received by DBMS 150 on server device 130. For example, the program on the desktop computer receives an indication of the database query submitted to the company server by Bill.

In an embodiment, sharing program 152 determines whether the workload should be shared (decision step 210). In other words, responsive to receiving an indication that the DBMS received a database query, sharing program 152 determines whether the workload associated with the database query should be shared. According to an embodiment, sharing program 152 splits the workload into multiple stages and performs a cost analysis of sharing one or more of the multiple stages (e.g., cost to process the stage in terms of memory, in terms of processor usage, etc.; cost of data reshuffling on the DBMS; cost of transmitting/receiving stages). Further according to the embodiment, the determination compares the cost analysis of sharing a stage with a threshold cost. In the embodiment, the threshold cost is the break-even cost point for performing a task (i.e., if the threshold cost is exceeded, the cost to perform the task is more expensive than not performing the task). In one embodiment (decision step 210, NO branch), sharing program 152 determines that the workload associated with the database query should not be shared; therefore, sharing program 152 proceeds to allow the DBMS to process the entire workload. In the embodiment (decision step 210, YES branch), sharing program 152 determines that the workload associated with the database query should be shared; therefore, sharing program 152 proceeds to the next step.

According to an embodiment of the present invention, sharing program 152 transmits plug-ins (step 212). In other words, responsive to determining that the workload associated with the database query should be shared, sharing program 152 can transmit one or more plug-ins to client device 120, if the plug-ins are needed by client device 120 for processing the shared workload. In an embodiment, the one or more plug-ins are software components that add specific features to at least one computer program on the client device, thus allowing client device 120 to more efficiently process the shared workload. In the embodiment, examples of plug-ins that may be transmitted to client device 120 include, but are not limited to, a plug-in to sum total sales, a plug-in to determine sales by month, a plug-in to determine sales by each salesman, a plug-in for performing processor intensive work (e.g., regression model fitting, advanced model fitting, machine learning and analytics), a plug-in for performing memory intensive work, a plug-in for performing intensive input/output work, etc. According to an embodiment, sharing program 152 transmits one or more plug-ins stored to plug-ins 144 in memory 140 on server device 130 to client device 120 via network 110. For example, the program on the desktop computer used by Bill receives three plug-ins transmitted from the company server for use in processing the shared workload on the desktop computer.

In an embodiment, sharing program 152 transmits workload (step 214). In other words, responsive to determining that the workload associated with the database query should be shared, sharing program 152 transmits a portion of the workload associated with the database query to client device 120. According to an embodiment, the portion of shared workload includes, but is not limited to, data to be processed and query code. Further, according to the embodiment, the portion of the workload that is shared is transmitted in stages and the stages can be transmitted in any form understood by the client (e.g., in plain text, parsed and annotated, a query compiled to the form of bytecode or machine code, a list of instructions in a programming language, etc.). In an embodiment, the portion of shared workload can be any portion of the workload associated with the database query, including one hundred percent of the workload. In another embodiment, the portion of shared workload is the amount of workload that can be processed by the resources available in the determined average usage of resources. According to an embodiment, sharing program 152 transmits a portion of the workload associated with the database query to client device 120 via network 110. For example, a program on the desktop computer used by Bill causes the company server to transmit a portion of the workload associated with the database query submitted by Bill to the desktop computer used by Bill for processing on the desktop computer utilizing the three plug-ins received by the desktop computer.

According to an embodiment of the present invention, sharing program 152 receives results (step 216). In other words, sharing program 152 receives the results of the portion of workload that was shared with and processed by client device 120. In an embodiment, client device 120 transmits the results to sharing program 152. In another embodiment, sharing program 152 retrieves the results of the portion of workload that was shared with and processed by client device 120 from a memory on client device 120 (not shown in FIG. 1). According to an embodiment, sharing program 152 receives the shared workload results from client device 120 via network 110. For example, the program on the desktop computer used by Bill receives the results of the desktop computer processing the portion of workload shared with the desktop computer; in the example, the program transmits the results to the DBMS on the company server.

In an embodiment, sharing program 152 processes the workload (step 218). In other words, responsive to receiving the results of the portion of the workload associated with the database query that was shared with and processed by client device 120, sharing program 152 processes the balance of the workload by transmitting the received results to DBMS 150 so that the entire database query workload can be processed. In the embodiment, the balance of the workload is a remainder of the workload associated with the database query request after the at least one portion of the workload was transmitted to the client device. Further in the embodiment, the processing of the balance of the workload by the database management system incorporates the received result from the processing of the at least one portion of the workload associated with the database query request that was shared with the client device. According to an embodiment, sharing program 152 processes the received results by storing the received results to a memory location in memory 140 (not shown in FIG. 1) or to any other memory location accessible by DBMS 150 so that the received results can be retrieved by DBMS 150. According to another embodiment, when sharing program 152 is on some other computing device rather than the computing device that includes DBMS 150, sharing program 152 transmits the received results to the computing device that includes DBMS 150. In an embodiment, sharing program 152 stores the results received from client device 120 via network 110 to a memory location accessible by DBMS 150; in the embodiment, DBMS 150 uses the results to complete the processing of the database query by processing the remainder of the workload incorporating the results received from client device 120. For example, the program on the desktop computer used by Bill transmits the results of the processed shared workload, which was processed on the desktop computer, to the company server where the DBMS on the company server can complete processing of the database query submitted by Bill.

According to an embodiment of the present invention, sharing program 152 transmits results (step 220). In other words, responsive to the complete database query being processed to a final result, sharing program 152 transmits the final result. In an embodiment, sharing program 152 transmits the final result to the computing device where the database query originated. In another embodiment, when sharing program 152 is included on the computing device where the database query originated, sharing program 152 transmits the final result to an operating system on said computing device so that the final result can be displayed to a user of said computing device. According to an embodiment, sharing program 152 transmits the final result to client device 120 via network 110. For example, the program on the desktop computer used by Bill requests transmission the completed database query results from the company server and displays the final result to Bill.

Figure 3:
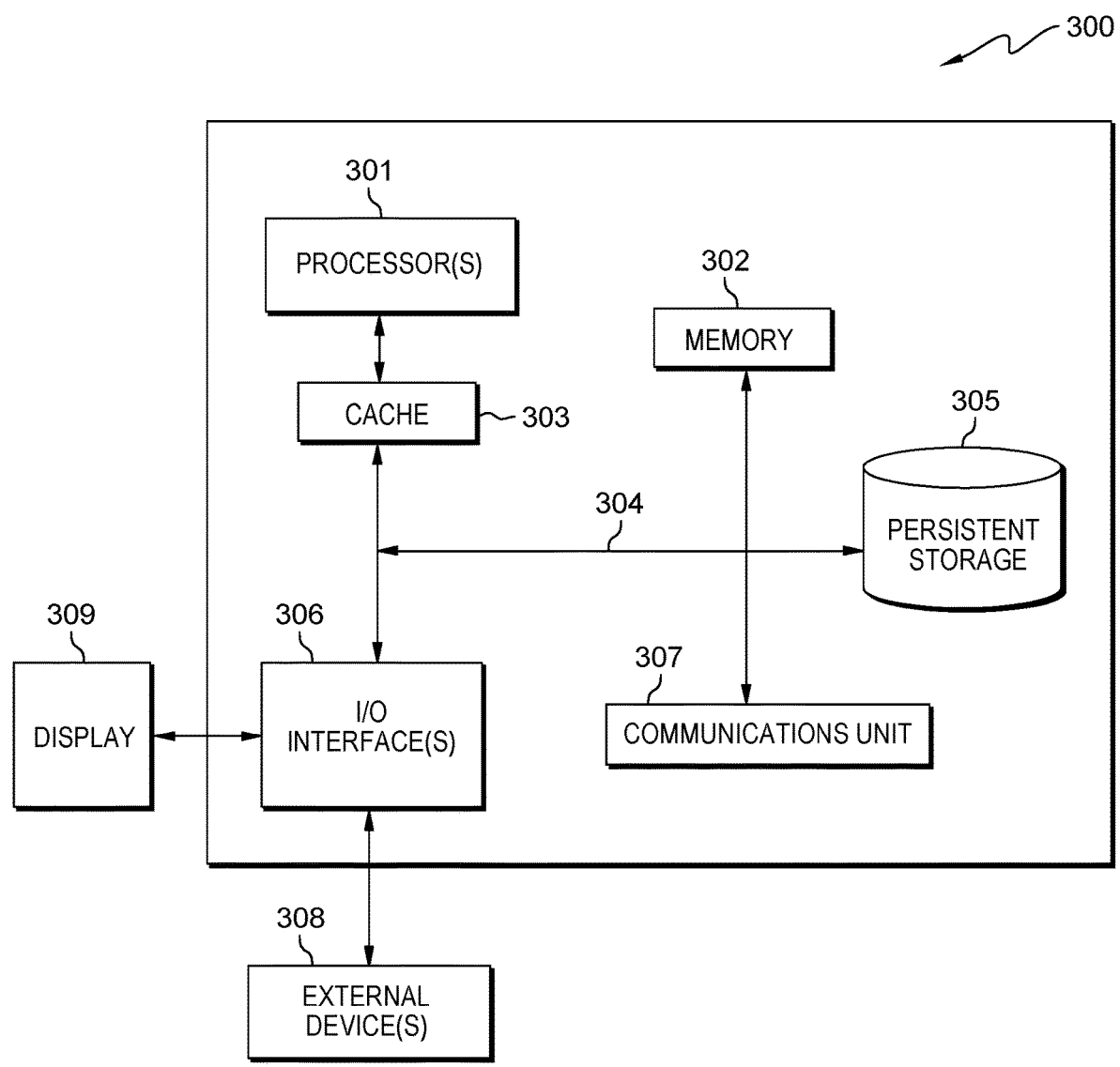
FIG. 3 depicts a block diagram of components of the computing environment of FIG. 1, in accordance with an embodiment of the present invention.

FIG. 3 depicts computer system 300, which is an example of a system that includes sharing program 152. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. PO interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   determining, by one or more computer processors, an average computing resource usage for each computing resource in one or more computing resources associated with a client device based on a plurality of real-time attributes received from the client device over a period of time;
   determining, by one or more computer processors, whether a workload associated with a database query request received by a database management system should be shared between the database management system and the client device;
   responsive to determining that the workload associated with the database query request should be shared between the database management system and the client device, transmitting, by one or more computer processors, one or more plug-ins from the database management system to the client device, wherein the one or more plug-ins are software components that add specific features to at least one computer program on the client device; and
   transmitting, by one or more computer processors, at least one portion of the workload associated with the database query request to the client device, wherein the client device processes the at least one portion of the workload using the transmitted one or more plug-ins, the at least one computer program on the client device, one or more other programs required to process the workload, and the one or more computing resources associated with the client device.

2. The method of claim 1, further comprising:
   receiving, by one or more computer processors, a result from the client device of the processed at least one portion of the workload associated with the database query request shared with the client device;
   processing, by one or more computer processors, a balance of the workload associated with the database query request by the database management system, wherein:
      the balance of the workload is a remainder of the workload associated with the database query request after the at least one portion of the workload was transmitted to the client device, and
      the processing of the balance of the workload by the database management system incorporates the received result from the processing of the at least one portion of the workload associated with the database query request that was shared with the client device; and
   transmitting, by one or more computer processors, a final result of the processing of the database query request by the database management system to the client device.

3. The method of claim 1, wherein the one or more computing resources associated with the client device include one of one-hundred percent of the one or more computing resources associated with the client device and a less than one-hundred percent subset of the one or more computing resources associated with the client device, wherein the less than one-hundred percent subset of the one or more computing resources associated with the client device reserves computing resources associated with the client device for use by the client device.

4. The method of claim 1, wherein:
   the determined average computing resource usage for each computing resource in the one or more computing resources associated with the client device are based on one of an overall average resource usage and a time specific resource usage, wherein:
      the overall average resource usage is a simple average of the plurality of the received real-time attributes independent of time; and
      the time specific resource usage is an average of the received real-time attributes for a specific time block, wherein the real-time attributes are received within the specific time block over the period of time.

5. The method of claim 1, wherein the step of determining, by one or more computer processors, whether a workload associated with the database query request should be shared between the database management system and the client device, comprises:
   splitting, by one or more computer processors, the workload associated with the database query request into multiple stages;
   performing, by one or more computer processors, a full cost analysis for sharing each stage of the multiple stages with the client device, wherein the full cost analysis comprises:
      a first cost analysis to process each stage in terms of memory and processor usage by each of the database management system and the client device;
      a second cost analysis to reshuffle data associated with the workload within the database management system; and
      a third cost analysis to transmit the stage to the client device and receive the data from the client device;
   comparing, by one or more computer processors, the full cost analysis for each stage of the multiple stages to a threshold cost; and
   determining, by one or more computer processors, to share at least one stage of the workload with the client device when the full cost analysis of sharing the at least one stage is less than the threshold cost.

6. The method of claim 5, wherein the threshold cost is a break-even cost point for sharing a stage of the multiple stages of the workload.

7. The method of claim 1, wherein the transmitted at least one portion of the workload is transmitted in a format selected from the group consisting of in plain text, as parsed and annotated, a query compiled to a form of bytecode or machine code, and a list of instructions in a programming language.

8. A computer program product, the computer program product comprising:
  one or more computer readable storage media; and
  program instructions stored on the one or more computer readable storage media, the program instructions comprising:
    program instructions to determine an average computing resource usage for each computing resource in one or more computing resources associated with a client device based on a plurality of real-time attributes received from the client device over a period of time;
    program instructions to determine whether a workload associated with a database query request received by a database management system should be shared between the database management system and the client device;
    responsive to determining that the workload associated with the database query request should be shared between the database management system and the client device, program instructions to transmit one or more plug-ins from the database management system to the client device, wherein the one or more plug-ins are software components that add specific features to at least one computer program on the client device; and
    program instructions to transmit at least one portion of the workload associated with the database query request to the client device, wherein the client device processes the at least one portion of the workload using the transmitted one or more plug-ins, the at least one computer program on the client device, one or more other programs required to process the workload, and the one or more computing resources associated with the client device.

9. The computer program product of claim 8, further comprising program instructions stored on the one or more computer readable storage media, to:
  receive a result from the client device of the processed at least one portion of the workload associated with the database query request shared with the client device;
  process a balance of the workload associated with the database query request by the database management system, wherein:
    the balance of the workload is a remainder of the workload associated with the database query request after the at least one portion of the workload was transmitted to the client device, and
    the processing of the balance of the workload by the database management system incorporates the received result from the processing of the at least one portion of the workload associated with the database query request that was shared with the client device; and
  transmit a final result of the processing of the database query request by the database management system to the client device.

10. The computer program product of claim 8, wherein the one or more computing resources associated with the client device include one of one-hundred percent of the one or more computing resources associated with the client device and a less than one-hundred percent subset of the one or more computing resources associated with the client device, wherein the less than one-hundred percent subset of the one or more computing resources associated with the client device reserves computing resources associated with the client device for use by the client device.

11. The computer program product of claim 8, wherein:
  the determined average computing resource usage for each computing resource in the one or more computing resources associated with the client device are based on one of an overall average resource usage and a time specific resource usage, wherein:
    the overall average resource usage is a simple average of the plurality of the received real-time attributes independent of time; and
    the time specific resource usage is an average of the received real-time attributes for a specific time block, wherein the real-time attributes are received within the specific time block over the period of time.

12. The computer program product of claim 8, wherein the program instructions to determine whether a workload associated with the database query request should be shared between the database management system and the client device, comprises:
  program instructions to split the workload associated with the database query request into multiple stages;
  program instructions to perform a full cost analysis for sharing each stage of the multiple stages with the client device, wherein the full cost analysis comprises:
    a first cost analysis to process each stage in terms of memory and processor usage by each of the database management system and the client device;
    a second cost analysis to reshuffle data associated with the workload within the database management system; and
    a third cost analysis to transmit the stage to the client device and receive the data from the client device;
  program instructions to compare the full cost analysis for each stage of the multiple stages to a threshold cost; and
  program instructions to determine to share at least one stage of the workload with the client device when the full cost analysis of sharing the at least one stage is less than the threshold cost.

13. The computer program product of claim 12, wherein the threshold cost is a break-even cost point for sharing a stage of the multiple stages of the workload.

14. The computer program product of claim 8, wherein the transmitted at least one portion of the workload is transmitted in a format selected from the group consisting of in plain text, as parsed and annotated, a query compiled to a form of bytecode or machine code, and a list of instructions in a programming language.

15. A computer system, the computer system comprising:
  one or more computer processors;
  one or more computer readable storage media; and
  program instructions stored on the one or more computer readable storage media for execution by at least one of the one or more computer processors, the program instructions comprising:
    program instructions to determine an average computing resource usage for each computing resource in one or more computing resources associated with a client device based on a plurality of real-time attributes received from the client device over a period of time;
    program instructions to determine whether a workload associated with a database query request received by a database management system should be shared between the database management system and the client device;
    responsive to determining that the workload associated with the database query request should be shared between the database management system and the client device, program instructions to transmit one or more plug-ins from the database management system to the client device, wherein the one or more plug-ins are software components that add specific features to at least one computer program on the client device; and program instructions to transmit at least one portion of the workload associated with the database query request to the client device, wherein the client device processes the at least one portion of the workload using the transmitted one or more plug-ins, the at least one computer program on the client device, one or more other programs required to process the workload, and the one or more computing resources associated with the client device.

16. The computer system of claim 15, further comprising program instructions stored on the one or more computer readable storage media for execution by at least one of the one or more computer processors, to:

receive a result from the client device of the processed at least one portion of the workload associated with the database query request shared with the client device;

process a balance of the workload associated with the database query request by the database management system, wherein:
    the balance of the workload is a remainder of the workload associated with the database query request after the at least one portion of the workload was transmitted to the client device, and
    the processing of the balance of the workload by the database management system incorporates the received result from the processing of the at least one portion of the workload associated with the database query request that was shared with the client device; and transmit a final result of the processing of the database query request by the database management system to the client device.

17. The computer system of claim 15, wherein the one or more computing resources associated with the client device include one of one-hundred percent of the one or more computing resources associated with the client device and a less than one-hundred percent subset of the one or more computing resources associated with the client device, wherein the less than one-hundred percent subset of the one or more computing resources associated with the client device reserves computing resources associated with the client device for use by the client device.

18. The computer system of claim 15, wherein:
    the determined average computing resource usage for each computing resource in the one or more computing resources associated with the client device are based on one of an overall average resource usage and a time specific resource usage, wherein:
        the overall average resource usage is a simple average of the plurality of the received real-time attributes independent of time; and
        the time specific resource usage is an average of the received real-time attributes for a specific time block, wherein the real-time attributes are received within the specific time block over the period of time.

19. The computer system of claim 15, wherein the program instructions to determine whether a workload associated with the database query request should be shared between the database management system and the client device, comprises:
    program instructions to split the workload associated with the database query request into multiple stages;
    program instructions to perform a full cost analysis for sharing each stage of the multiple stages with the client device, wherein the full cost analysis comprises:
        a first cost analysis to process each stage in terms of memory and processor usage by each of the database management system and the client device;
        a second cost analysis to reshuffle data associated with the workload within the database management system; and
        a third cost analysis to transmit the stage to the client device and receive the data from the client device;
    program instructions to compare the full cost analysis for each stage of the multiple stages to a threshold cost; and
    program instructions to determine to share at least one stage of the workload with the client device when the full cost analysis of sharing the at least one stage is less than the threshold cost.

20. The computer system of claim 19, wherein the threshold cost is a break-even cost point for sharing a stage of the multiple stages of the workload.

* * * * *